(12) United States Patent
Grantz et al.

(10) Patent No.: US 8,497,609 B2
(45) Date of Patent: Jul. 30, 2013

(54) RESTRAINING MOTOR SHAFT PLAY

(76) Inventors: Alan Lyndon Grantz, Aptos, CA (US); Lynn Bich-Quy Le, San Jose, CA (US)

(*) Notice: Subject to any disclaimer, the term of this patent is extended or adjusted under 35 U.S.C. 154(b) by 277 days.

(21) Appl. No.: 12/902,035

(22) Filed: Oct. 11, 2010

(65) Prior Publication Data

US 2012/0087607 A1    Apr. 12, 2012

(51) Int. Cl.
 *H02K 7/00* (2006.01)
(52) U.S. Cl.
 USPC .......................................... 310/67 R; 310/51
(58) Field of Classification Search
 USPC ............. 310/67 R, 91, 51, 99.08; 360/99.08, 360/97.02
 See application file for complete search history.

(56) References Cited

U.S. PATENT DOCUMENTS

| 4,797,762 | A | | 1/1989 | Levy et al. |
| 5,213,879 | A | * | 5/1993 | Niwa et al. .................... 428/213 |
| 5,330,165 | A | * | 7/1994 | van Goubergen ............. 267/141 |
| 5,366,200 | A | * | 11/1994 | Scura ............................ 248/632 |
| 5,517,375 | A | * | 5/1996 | Dion et al. ................. 360/98.07 |
| 5,825,585 | A | * | 10/1998 | Hatam-Tabrizi ........... 360/99.16 |
| 6,177,173 | B1 | * | 1/2001 | Nelson .......................... 428/137 |
| 6,249,400 | B1 | * | 6/2001 | Hong et al. ................. 360/99.18 |
| 6,536,555 | B1 | * | 3/2003 | Kelsic et al. .................. 181/207 |
| 6,665,140 | B1 | * | 12/2003 | Prochazka et al. ......... 360/99.08 |
| 6,751,051 | B1 | * | 6/2004 | Garbarino .................. 360/99.08 |
| 6,801,386 | B1 | * | 10/2004 | Niroot et al. ............... 360/99.18 |
| 6,991,376 | B2 | | 1/2006 | Aiello et al. |
| 7,023,657 | B2 | * | 4/2006 | Sohn et al. ................. 360/99.08 |
| 7,239,477 | B2 | | 7/2007 | Aiello et al. |
| 2003/0048576 | A1 | | 3/2003 | Sohn et al. |
| 2007/0145837 | A1 | | 6/2007 | Herndon et al. |

OTHER PUBLICATIONS

PCT search report for PCT/US2011/055127, Feb. 22, 2012.
PCT written opinion for PCT/US2011/055127, Feb. 22, 2012.

* cited by examiner

*Primary Examiner* — Thanh Lam
(74) *Attorney, Agent, or Firm* — Braden Katterheinrich

(57) ABSTRACT

An apparatus and associated method characterized by an enclosure having a side member that defines a substantially orthogonally directed cavity penetrating the side member. A motor shaft in the enclosure has a distal end that is operably aligned with the cavity. A shear transfer member in the enclosure is operably affixed to the motor shaft. One of the shaft and the shear transfer member is sized for a close mating engagement with the side member in the cavity, and the shear transfer member is further sized for being simultaneously shear coupled to the side member.

20 Claims, 3 Drawing Sheets

RESTRAINING MOTOR SHAFT PLAY

SUMMARY

In some embodiments an apparatus is provided that is characterized by an enclosure having a side member that defines a substantially orthogonally directed cavity penetrating the side member. A shaft in the enclosure has a distal end that is operably aligned with the cavity. A shear transfer member in the enclosure is operably affixed to the shaft. One of the shaft and the shear transfer member is sized for a close mating engagement with the side member in the cavity, and the shear transfer member is further sized for being simultaneously shear coupled to the side member.

In some embodiments a method is provided that includes the steps of obtaining an enclosure having a side member that defines a substantially orthogonally directed cavity penetrating the side member; affixing a shear transfer member to a shaft; aligning the shaft with the cavity by inserting one of the shaft and the shear transfer member into the cavity in a close mating engagement with the side member; and after the affixing and aligning steps, shear coupling the shear transfer member to the side member in the enclosure.

In some embodiments an apparatus is provided having an enclosure containing a motor, and means for restraining shaft play in the motor by transferring a shear load from the shaft to the enclosure.

DETAILED DESCRIPTION

Figure 1:
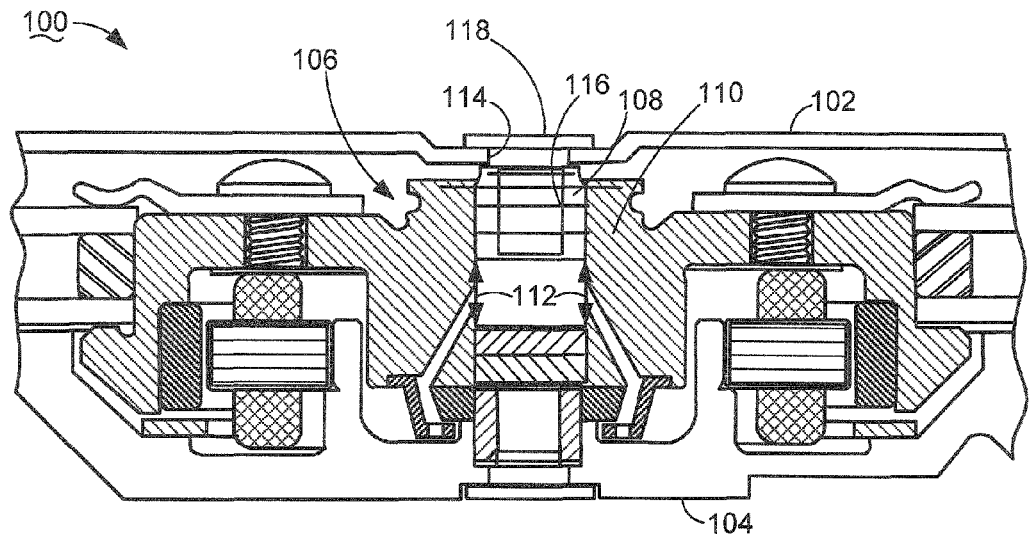
FIG. 1 is a partial cross sectional depiction of a fluid dynamic bearing ("FDB") motor illustratively employed in a data storage device.

There is a vast variety of devices that can be generally characterized as being portable or transportable devices having an enclosure operably supporting an internal component. The portable nature of such devices means they can be routinely subjected to external shocks of various magnitudes. Accordingly, the manner in which the internal component is attached to the enclosure must be robust enough to withstand those external shocks, so that the component is capable of reliably performing its intended purpose.

In the following, an illustrative example of such a device is a data storage device, which is well suited for employing the embodiments of the present invention. However, the example is entirely illustrative and therefore not limiting of the scope of the claims. The skilled artisan, having understood the illustrative embodiments, further understands without any need for enumeration that many other devices are equally well suited for employing the embodiments of the present invention.

Moving media types of data storage devices generally utilize a spindle motor, such as but not limited to a fluid dynamic bearing ("FDB") motor, having a stationary shaft to which a hub is journalled for selective rotation. The media is attached to the hub and fixed in rotation therewith. Storage areas of the rotating media are presented to a data transfer member which is, in turn, in electrical communication with control electronics for ultimately communicating data transfer commands with other devices. As such, the operable positional veracity of the storage areas is a key performance parameter that is necessary to ensure that reliable data transfer operations can occur. In other words, the external forces from routine handling and transporting of the data storage device must not result in out-of-plane motion of the media, referred to herein as resulting from undesired lateral and/or longitudinal motion of the shaft, or "shaft play," to the extent it would adversely interrupt reliable data transfer operations. The FDB motor's inherent resistance to a shear load causing shaft play is herein referred to as "bearing stiffness," meaning the characteristic radial and/or lateral stiffness of the bearing.

A couple of market-driven factors for data storage devices that are problematic to bearing stiffness design are reduced size and increased data storage capacity. As for the former factor, one way of achieving the requisite bearing stiffness in related art solutions is by directly attaching the stationary shaft portion of the FDB motor to the enclosure with a fastener affecting a tensile attachment force, such as a threaded fastener. That type of connection effectively eliminates the radial and longitudinal components of shaft play. However, the continual shrinkage in the physical size of data storage devices over the past few years is limited because the mating threaded fastener components can only be manufactured so small and yet still withstand the torque that is necessary for the requisite bearing stiffness. Also, although reducing the size of the stationary shaft advantageously reduces the power necessary to operate the FDB motor, the reduced-diameter shaft also disadvantageously reduces the surface area over which the attachment force of the threaded fastener is distributed. As for the latter factor, the continual increase in areal data storage density in recent years means that shaft play once ignored as negligible can now cause a data transfer failure, meaning the data storage device is more sensitive and hence more susceptible to data transfer failures from the external forces.

Turning now to FIG. 1, which depicts a partial cross sectional view of a FDB motor that is constructed in accordance with related art attempted solutions in a data storage device 100. Again, the reference to an FDB type of motor and its use in a data storage device are merely illustrative to facilitate this description, and as such are in no way limiting of the embodiments of the present invention. The data storage device 100 has an enclosure defined by the attachment of a first side member 102 to a second side member 104. In the depicted orientation the first side 102 is sometimes referred to as a cover, and the second side member 104 referred to as a base having upstanding side portions, not depicted here, so that attachment of the cover to the base forms a sealed enclosure that protects the internal components from the external environment.

The FDB motor 106 has a stationary shaft 108 around which a hub 110 is journalled for selective rotation. In these depicted embodiments a fluid dynamic bearing 112 is established by the pumping action on a lubricating fluid in a small annular region between the shaft 108 and the hub 110, upon which the hub 110 is operably supported in rotation. In alternative equivalent embodiments other types of bearing constructions can be employed, such as but not limited to those employing physically contacting bearing surface elements.

An orthogonally directed aperture 114 is formed through the thickness of the first side member 102. A threaded aperture 116 in the distal end of the shaft 108 is aligned with the aperture 114, permitting a threaded fastener 118 to be passed through the aperture 114 to threadingly engage the threaded aperture 116. Torquing the threaded fastener 118 to a predetermined value affixes the top end of the FDB motor 106 to the enclosure, thereby restraining undesired radial and longitudinal motion of the top of the motor shaft 108 to provide a desired bearing stiffness. It will be noted that the bottom of the shaft 108 is attached to the second side member 104 in the same manner.

Figure 2:
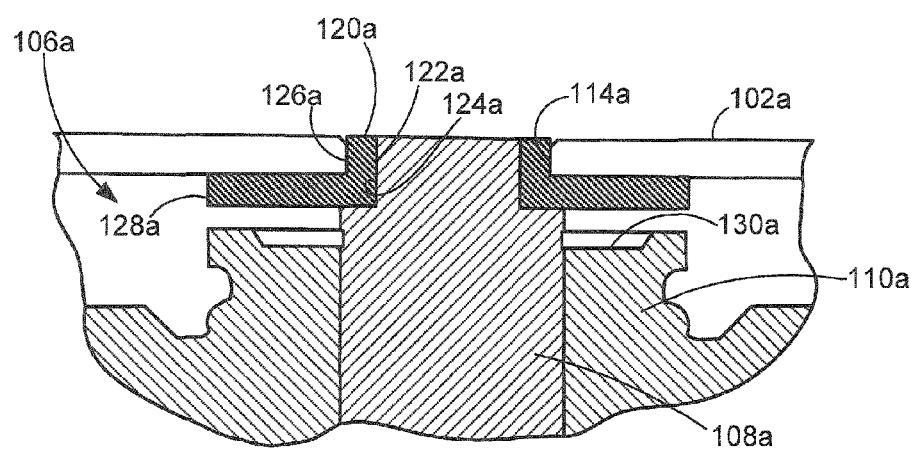
FIG. 2 is an enlarged portion similar to FIG. 1 but depicting an FDB motor that is illustratively constructed in accordance with embodiments of the present invention.

FIG. 2 is an enlarged detail of a portion of an FDB motor 106a similar to that of FIG. 1, but constructed in accordance with embodiments of the present invention. In these embodiments the shaft 108a can readily be made of a smaller diameter because there is no need to form a threaded opening in the distal end of the shaft 108a. The smaller diameter of the shaft 108a can advantageously integrate into physically smaller packages and also advantageously reduce the input power requirements to the FDB motor 106a.

An annular shear transfer member 120a is affixed to the distal end of the shaft 108a to eliminate any radial or longitudinal motion of the shaft 108a relative to the shear transfer member 120a. For example, the shear transfer member 120a can be press fit to the shaft 108. By "press fit" it is meant that the inner diameter of the shear transfer member 120a defined by inner surface 122a is sized to provide an interference fit with the diameter of the distal end of the shaft 108a defined by the surface 124a. Alternatively, the shear transfer member 120a can be affixed to the shaft 108a in other ways such as but not limited to adhering, welding, upset forming, overmolding, and the like.

Note that in these embodiments both the distal end of the shaft 108a and the shear transfer member 120a penetrate the cavity in the first side member 102a. In these illustrative embodiments the cavity extends completely through the material thickness of the first side member 102a, although that is not necessarily required. In alternative embodiments the cavity can be formed only partially through the material thickness of the first side member 102, and as such the distal end of the shaft 108a and the shear transfer member 120a only partially penetrate the first side member 102a. That partial penetration would advantageously eliminate an external penetration in the enclosure, simplifying the package design for sealing the enclosure.

The opposing outer diameter of the shear transfer member 120a defined by the outer surface 126a is sized for a close mating engagement with the surface 114a defining the cavity in the first side member 102a. For a maximum restraint of radial motion the outer surface of the shear transfer member 120a can be affixed to the first side member 102a in the cavity, such as by a press fit or adhering and the like. In those embodiments undesired radial motion of the shaft 108a (shaft play) is prevented by radial restraining forces directly imparted by the first side member 102a via its surface 114a defining the cavity. Affixing the shear transfer member 120a to the enclosure, such as by a press fit, also prevents undesired longitudinal motion of the shaft 108a (shaft play). Alternatively, in some instances a sufficient bearing stiffness can be achieved by sizing the outer surface 126a of the shear transfer member 120a for a slip fit against the surface 114a defining the cavity, advantageously simplifying the assembly procedure.

Importantly, the present embodiments also simultaneously transfer the shear load from the shaft 108a and/or the shear transfer member 120a to the enclosure. The shear transfer member 120a has a radially directed flange 128a extending from the outer surface 126a that is sized to contactingly engage a planar portion of the first side member 102a inside the enclosure. That contacting engagement is advantageously used to distribute shear coupling forces between the shear transfer member 120a and the first side member 102a over an extended surface area. Note, for example, that the radial length over which the shear coupling force is distributed is at least twice the material thickness of the first side member 102a in these depicted embodiments.

In the case where the shear transfer member 120a is press fit to the first side member 102a, then that press fit directly opposes both radial and longitudinal components of motion of the shaft 108a, and as such the shear coupling between the flange 128a and the first side member 102a provides cumulative restraint to that radial motion. In the case where the shear transfer member 120a is slip fit to the first side member 102a, then the shear coupling between the flange 128 and the first side member 102a provides the primary restraint to the radial motion of the motor shaft 108a.

The shear coupling between the shear transfer member 120a and the first side member 102a can be achieved by adhering them together. For example, a pressure sensitive adhesive ("PSA") can be used to adhere them together upon coming into contact with each other. For rework sake, it can be advantageous to use a PSA double sided tape with a stronger bond on one side so that the PSA stays with a desired one of the shear transfer member 120a or the first side member 102a when the shear coupled components are disassembled. In equivalent alternative embodiments the shear transfer member 120a can first be affixed to the first side member 102a, such as by adhering or welding and the like, and then press fit to the shaft 108a during assembly operations. In other equivalent alternative embodiments a sufficient shear coupling force can be achieved simply by frictionally engaging the shear transfer member 120a and the first side member 102a together, such as by making the shear transfer member 120a of a select elastomeric material having a high coefficient of static friction. An elastomeric construction of the shear transfer member 120a has also been demonstrated in testing to be advantageous for significantly damping operating resonance, preventing its propagation from the FDB motor 106 excitation to the media via the shaft 108a.

Besides the flange 128a providing an extended surface area over which the shear coupling force is distributed, note that the flange 128a also advantageously serves as a protective cover for the FDB 112 at an upper end thereof that terminates in a basin 130a formed by the hub 110 where a fluid meniscus is maintained.

Figure 3:
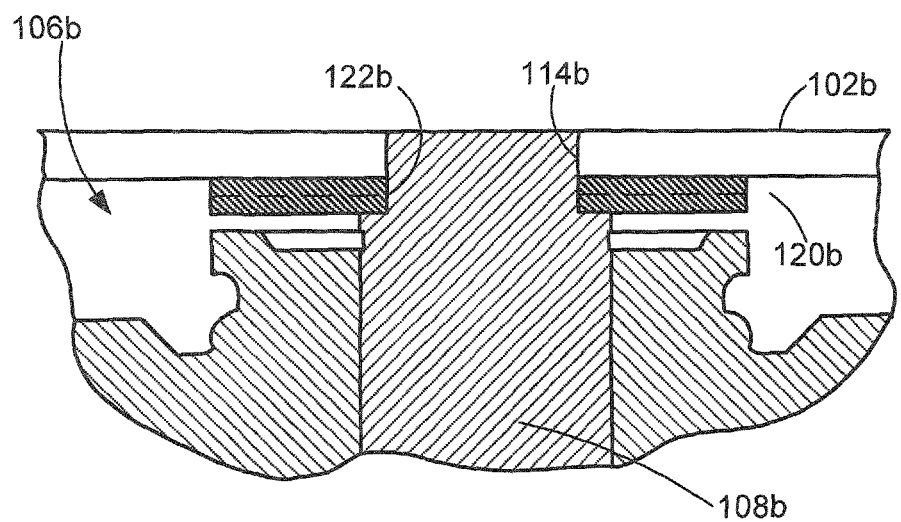
FIG. 3 is a depiction similar to FIG. 2 but depicting an FDB motor that is illustratively constructed in accordance with other embodiments of the present invention.

FIG. 3 depicts a view similar to that of FIG. 2 but depicting an FDB motor 106b that is constructed in accordance with equivalent alternative embodiments of the present invention. Here another annular shear transfer member 120b likewise has an inner surface 122b defining a diameter that is sized to be affixed to the shaft 108b, such as by being press fit or adhered thereto. Unlike the embodiments depicted in FIG. 2, however, the shear transfer member 120b does not penetrate the first side member 102b in the cavity; instead, in these embodiments only the distal end of the shaft 108b penetrates the first side member 102b in the cavity. Thus, here it is the distal end of the shaft 108b that is sized to define a close mating engagement with the surface 114b of the first side member 102b defining the cavity. Similarly to the foregoing, for a maximum restraint of radial and longitudinal motion the distal end of the shaft 108b can be sized to press fit (or adhered to and the like) the surface 114b of the first side member 102b defining the cavity. Where less radial restraint is adequate, then the distal end of the shaft 108b can be sized to slip fit the surface 114b. Also as described above, although the cavity is depicted as penetrating completely through the thickness of the first side member 102b, in alternative equivalent embodiments the cavity can only partially penetrate the thickness of the first side member 102b.

Figure 4:
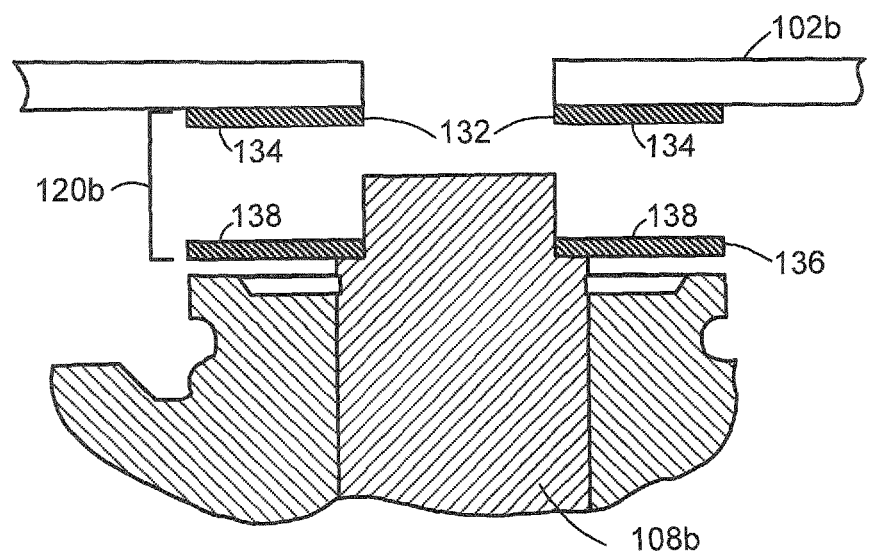
FIG. 4 is an enlarged portion similar to FIG. 3 but depicting an FDB motor that is illustratively constructed in accordance with other embodiments of the present invention.

The shear transfer member 120b can be shear coupled to the first side member 102b in any of the ways contemplated above. Alternatively, FIG. 4 depicts an enlarged exploded view depicting the shear transfer member 120b as having a first portion 132 that is affixed to the first side member 102b and defines a first surface 134. The shear transfer member 120b also has a second portion 136 that is affixed to the motor shaft 108b and defines a second surface 138. The shear coupling is created by the pressing engagement of the surfaces 134, 138 together, in any of the manners contemplated in the foregoing, when the exploded components are assembled together.

Figure 5:
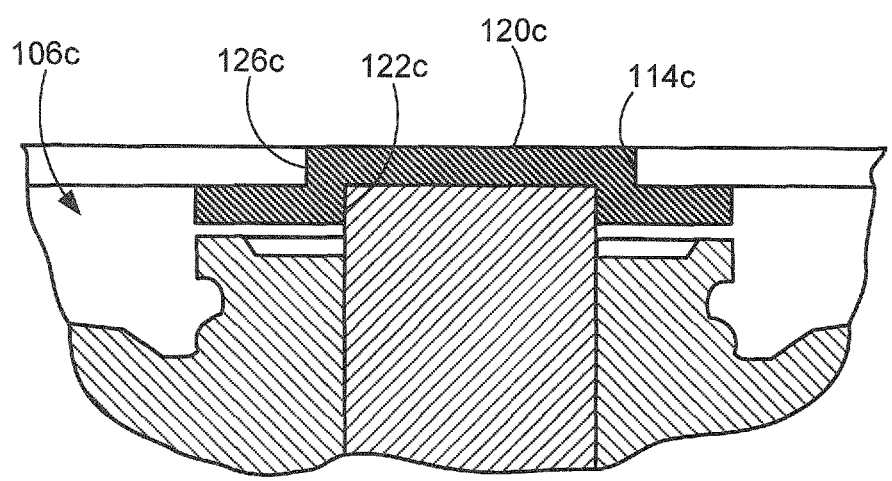
FIG. 5 is a depiction similar to FIG. 2 but depicting an FDB motor that is illustratively constructed in accordance with other embodiments of the present invention.

FIG. 5 likewise depicts a view similar to that of FIG. 2 but depicting an FDB motor 106c that is constructed in accordance with yet other equivalent alternative embodiments of the present invention. Here another annular shear transfer member 120c likewise has an inner surface 122c defining a diameter that is sized to be affixed to the shaft 108c, such as by being press fit or adhered thereto. Unlike the embodiments depicted in FIG. 2, however, the shear transfer member 120c forms a hat section that entirely covers the distal end of the shaft 108c. Depending on the selected web thickness of the shear transfer member 120c and the thickness of the side member 102c, the distal end of the shaft 108c may or may not join the shear transfer member 120c in penetrating the first side member 102c in the cavity. Like the embodiments of FIG. 2, the outer surface 126c of the shear transfer member 120c is sized to define a close mating engagement with the surface 114c of the first side member 102c defining the cavity. Similarly to the foregoing, for a maximum restraint of radial and longitudinal motion the outer surface 126c can be sized to press fit (or adhered to and the like) the surface 114c of the first side member 102c defining the cavity. Again, where less radial restraint is adequate, then the outer surface 126c can be sized to slip fit the surface 114c. Also as described above, although the cavity is depicted as penetrating completely through the thickness of the first side member 102c, in alternative equivalent embodiments the cavity can only partially penetrate the thickness of the first side member 102c.

The many embodiments of this invention described in the foregoing have been shown to contemplate an apparatus generally having an enclosure containing a motor, and means for restraining shaft play in the motor by transferring a shear load from the shaft to the enclosure. For purposes of this description and meaning of the claims, the term "means for restraining" is expressly defined to mean the disclosed structure and structural equivalents thereof that are capable of transferring a shear load from the shaft to the enclosure. As such, the term "means for restraining" expressly does not include structures of previously attempted solutions such as those that employ a fastener to directly attach the enclosure to the motor shaft with a tensile attachment force.

The contemplated embodiments of the present invention include not only those of the foregoing apparatus but also include an associated method that obtains an enclosure having a side member that defines a substantially orthogonally directed cavity penetrating the side member. The method of the present embodiments further contemplates affixing a shear transfer member to a motor shaft, aligning the motor shaft with the cavity by inserting one of the shaft and the shear transfer member into the cavity in a close mating engagement with the side member, and after the affixing and aligning steps, shear coupling the shear transfer member to the side member in the enclosure.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms in which the appended claims are expressed.

What is claimed:

1. An apparatus comprising:
   an enclosure having a cover defining an aperture;
   a motor shaft having a distal end contactingly engaged with an internal surface of the aperture; and
   a shear transfer member positioned between the cover and a portion of the motor shaft.

2. The apparatus of claim 1, wherein the shear transfer member comprises an elastomeric material.

3. The apparatus of claim 1, wherein the cover has an external and internal surface, wherein the shear member is contactingly engaged to the motor shaft and the internal surface of the cover.

4. The apparatus of claim 3, wherein the shear transfer member is adhered to the internal surface of the cover.

5. The apparatus of claim 1, wherein the shear transfer member comprises two portions, the first portion attached to an internal surface of the cover and the second portion is attached to the motor shaft.

6. The apparatus of claim 5, wherein the first and second portions of the shear transfer member are contactingly engaged.

7. The apparatus of claim 1, wherein the shaft is contactingly engaged with internal surface of the aperture in a press-fit relationship.

8. The apparatus of claim 1, wherein the motor shaft is adhered to the internal surface of the aperture.

9. The apparatus of claim 1, wherein the aperture is circular shaped.

10. The apparatus of claim 1, wherein the distal end of the motor shaft is only partially disposed in aperture.

11. The apparatus of claim 1, wherein the shear transfer member is positioned completely within the enclosure.

12. The apparatus of claim 1, wherein the distal end of the motor shaft fills the aperture.

13. An apparatus comprising:
    an enclosure having a cover defining a cavity on an internal surface of the enclosure, the cavity having a depth less than a thickness of the cover;
    a shaft having a distal end sized to be contactingly engaged with an internal surface of the cavity, the distal end positioned within the cavity; and
    a shear transfer member positioned between the cover and a portion of the shaft.

14. The apparatus of claim 13, wherein the shear transfer member comprises an elastomeric material.

15. The apparatus of claim 13, wherein the enclosure has an external and internal surface, wherein the shear member is contactingly engaged with the shaft and the internal surface of the enclosure.

16. The apparatus of claim 15, wherein the shear transfer member is adhered to the internal surface of the enclosure.

17. The apparatus of claim 13, wherein the shaft is adhered to the internal surface of the cavity.

18. An apparatus comprising:
   an enclosure having a cover defining an aperture;
   a shaft having a distal end sized to be contactingly engaged with an internal surface of the aperture, the distal end positioned within the aperture; and
   a shear transfer member positioned between the cover and a portion of the shaft.

19. The apparatus of claim 18, wherein the shear transfer member is positioned completely within the enclosure.

20. The apparatus of claim 18, wherein the distal end of the shaft fills the aperture.

* * * * *